US011765081B2

(12) United States Patent
Chandra et al.

(10) Patent No.: US 11,765,081 B2
(45) Date of Patent: *Sep. 19, 2023

(54) OFFLOADS FOR MULTICAST VIRTUAL NETWORK PACKET PROCESSING IN A NETWORK INTERFACE CARD

(71) Applicant: Google LLC, Mountain View, CA (US)

(72) Inventors: Prashant R. Chandra, San Jose, CA (US); Balakrishna Raghunath, San Jose, CA (US); Uday Ramakrishna Naik, Pleasanton, CA (US); Michael Dalton, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,348

(22) Filed: Aug. 18, 2022

(65) Prior Publication Data

US 2022/0393977 A1  Dec. 8, 2022

Related U.S. Application Data

(63) Continuation of application No. 17/119,275, filed on Dec. 11, 2020, now Pat. No. 11,463,354, which is a
(Continued)

(51) Int. Cl.
*H04L 45/64* (2022.01)
*H04L 45/586* (2022.01)
(Continued)

(52) U.S. Cl.
CPC ........ *H04L 45/586* (2013.01); *G06F 9/45558* (2013.01); *H04L 45/64* (2013.01);
(Continued)

(58) Field of Classification Search
CPC ....... H04L 45/16; H04L 12/18; H04L 12/185; H04L 12/1886; H04L 12/4633;
(Continued)

(56) References Cited

U.S. PATENT DOCUMENTS 8,213,429 B2   7/2012  Wray et al.
9,008,085 B2   4/2015  Kamble et al.
(Continued)

OTHER PUBLICATIONS

Dalton, Michael, et al. "Andromeda: Performance, Isolation, and Velocity at Scale in Cloud Network Virtualization." in 15th {USENIX} Symposium on Networked Systems Design and Implementation, NSDI '18, USENIX Association, Apr. 9-11, 2018.
(Continued)

*Primary Examiner* — Atique Ahmed
(74) *Attorney, Agent, or Firm* — Lerner David LLP

(57) ABSTRACT

Systems and methods of offloading multicast virtual network packet processing to a network interface card are provided. In an example implementation, a network interface card can route packets in a virtual network. The network interface card can be configured to receive a data packet having a multicast header for transmission to a plurality of destination virtual machines. The network interface card can retrieve a list of next hop destinations for the data packet. The network interface card can replicate the packet for each next hop destination. The network interface card can encapsulate each replicated packet with a unicast header that includes a next hop destination virtual IP address indicating the next hop destination and a source virtual IP address, and transmit the encapsulated packets.

20 Claims, 6 Drawing Sheets

Related U.S. Application Data continuation of application No. 16/272,518, filed on Feb. 11, 2019, now Pat. No. 10,880,208.

(51) Int. Cl.
*G06F 9/455* (2018.01)
*H04L 45/745* (2022.01)
*H04L 69/22* (2022.01)
*H04L 61/5007* (2022.01)

(52) U.S. Cl.
CPC ........ *H04L 45/745* (2013.01); *H04L 61/5007* (2022.05); *H04L 69/22* (2013.01); *G06F 2009/45595* (2013.01)

(58) Field of Classification Search
CPC ..... H04L 45/586; H04L 45/64; H04L 45/745; H04L 61/5007; H04L 69/22; G06F 9/45558; G06F 2009/45595
See application file for complete search history.

(56) References Cited

U.S. PATENT DOCUMENTS

| | | | |
|---|---|---|---|
| 2003/0133412 A1 | 7/2003 | Iyer et al. | |
| 2003/0200315 A1 | 10/2003 | Goldenberg et al. | |
| 2004/0015966 A1 | 1/2004 | MacChiano et al. | |
| 2004/0028058 A1* | 2/2004 | Katoh | H04L 12/1886 370/395.54 |
| 2004/0077335 A1 | 4/2004 | Lee et al. | |
| 2004/0267866 A1* | 12/2004 | Carollo | H04L 61/35 709/200 |
| 2008/0137660 A1 | 6/2008 | Olakangil et al. | |
| 2011/0075667 A1 | 3/2011 | Li et al. | |
| 2012/0170578 A1 | 7/2012 | Anumala et al. | |
| 2013/0117766 A1* | 5/2013 | Bax | G06F 9/4401 719/323 |
| 2013/0322446 A1* | 12/2013 | Biswas | H04L 12/4633 370/392 |
| 2014/0032796 A1 | 1/2014 | Krause | |
| 2014/0036892 A1 | 2/2014 | Zhu | |
| 2014/0153577 A1 | 6/2014 | Janakiraman et al. | |
| 2015/0063360 A1* | 3/2015 | Thakkar | H04L 49/3009 370/400 |
| 2015/0180673 A1* | 6/2015 | Kuwata | H04L 12/185 370/254 |
| 2015/0280928 A1* | 10/2015 | Tessmer | H04L 12/18 370/390 |
| 2016/0359729 A1 | 12/2016 | Banavalikar | |
| 2017/0078188 A1* | 3/2017 | Allan | H04L 12/185 |
| 2018/0048478 A1 | 2/2018 | Tessmer et al. | |
| 2018/0309617 A1* | 10/2018 | Xiao | H04L 41/122 |
| 2019/0132241 A1* | 5/2019 | Vattem | H04L 12/4633 |

OTHER PUBLICATIONS

Firestone, Daniel. "VFP: A Virtual Switch Platform for Host SDN in the Public Cloud", Proceedings of the 4th USENIX Symposium on Networked Systems Design and Implementation (NSDI '17), Mar. 27-29, 2017.

International Preliminary Reporton Patentability for International Application No. PCT/US2019/060461 dated Aug. 26, 2021. 11 pages.

International Search Report and Written Opinion for International Application No. PCT/US2019/060461 dated Feb. 27, 2020. 18 pages.

Jannotti, John, et al. "Overcast: reliable multicasting with on overlay network." In Proceedings of the 4th conference an Symposium on Operating System Design & Implementation, vol. 4, p. 14. USENIX Association, Oct. 22, 2000.

Komolafe, Olufemi: "IP multicast in virtualized data centers: Challenges and opportunities", 2017 IFIP/IEEE Symposium on Integrated Network and Service Management (IM), IFIP, May 8, 2017 (May 8, 2017), pp. 407-413, XP033127588, DOI: 10.23919/INM. 2017.7987305 [retrieved on Jul. 20, 2017].

* cited by examiner

OFFLOADS FOR MULTICAST VIRTUAL NETWORK PACKET PROCESSING IN A NETWORK INTERFACE CARD

CROSS-REFERENCE TO RELATED APPLICATIONS

The present application is a continuation of U.S. patent application Ser. No. 17/119,275, filed Dec. 11, 2020, which is a continuation of U.S. patent application Ser. No. 16/272,518, filed Feb. 11, 2019, now U.S. Pat. No. 10,880,208, the disclosures of which are hereby incorporated herein by reference.

BACKGROUND

In a cloud computing environment, a single server or host may run multiple virtual machines. In some cases, the cloud service provider may create mechanisms to facilitate communication between virtual machines either on a single host or on separate hosts. For reasons of security and stability of the system, the provider may not wish to grant virtual machines unfettered access to the provider's network. The provider may thus create a virtual network for each customer. The customers' respective virtual machines can then communicate with each other, without risk of unauthorized access to another customer's virtual machines.

SUMMARY

At least one aspect is directed to a method of routing data packets in a virtual network. The method includes receiving, at a processor of a network interface card of a host device, a data packet for transmission to a plurality of destination virtual machines. The data packet has a multicast header that includes a first source virtual IP address (VIP) and a destination multicast group designation. The method includes retrieving, using the processor, a list of next hop destinations for the data packet based on the destination multicast group designation. Each next hop destination is one of a remote device different from the host device or a local virtual machine executing on the host device. The method includes replicating, by the processor, the data packet for each next hop destination. The method includes encapsulating, by the processor, each replicated packet with a unicast header that includes a next hop destination VIP indicating the next hop destination and a second source VIP. The method includes transmitting, by the processor, the encapsulated packets.

At least one aspect is directed to a network interface card configured to route data packets in a virtual network. The network interface card resides in a host device and includes a processor configured to receive a data packet for transmission to a plurality of destination virtual machines. The data packet has a multicast header that includes a first source virtual IP address (VIP) and a destination multicast group designation. The network interface card processor is configured to retrieve a list of next hop destinations for the data packet based on the destination multicast group designation. Each next hop destination is one of a remote device different from the host device or a local virtual machine executing on the host device. The network interface card processor is configured to replicate the data packet for each next hop destination. The network interface card processor is configured to encapsulate each replicated packet with a unicast header that includes a next hop destination VIP indicating the next hop destination and a second source VIP. The network interface card processor is configured to transmit the encapsulated packets.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
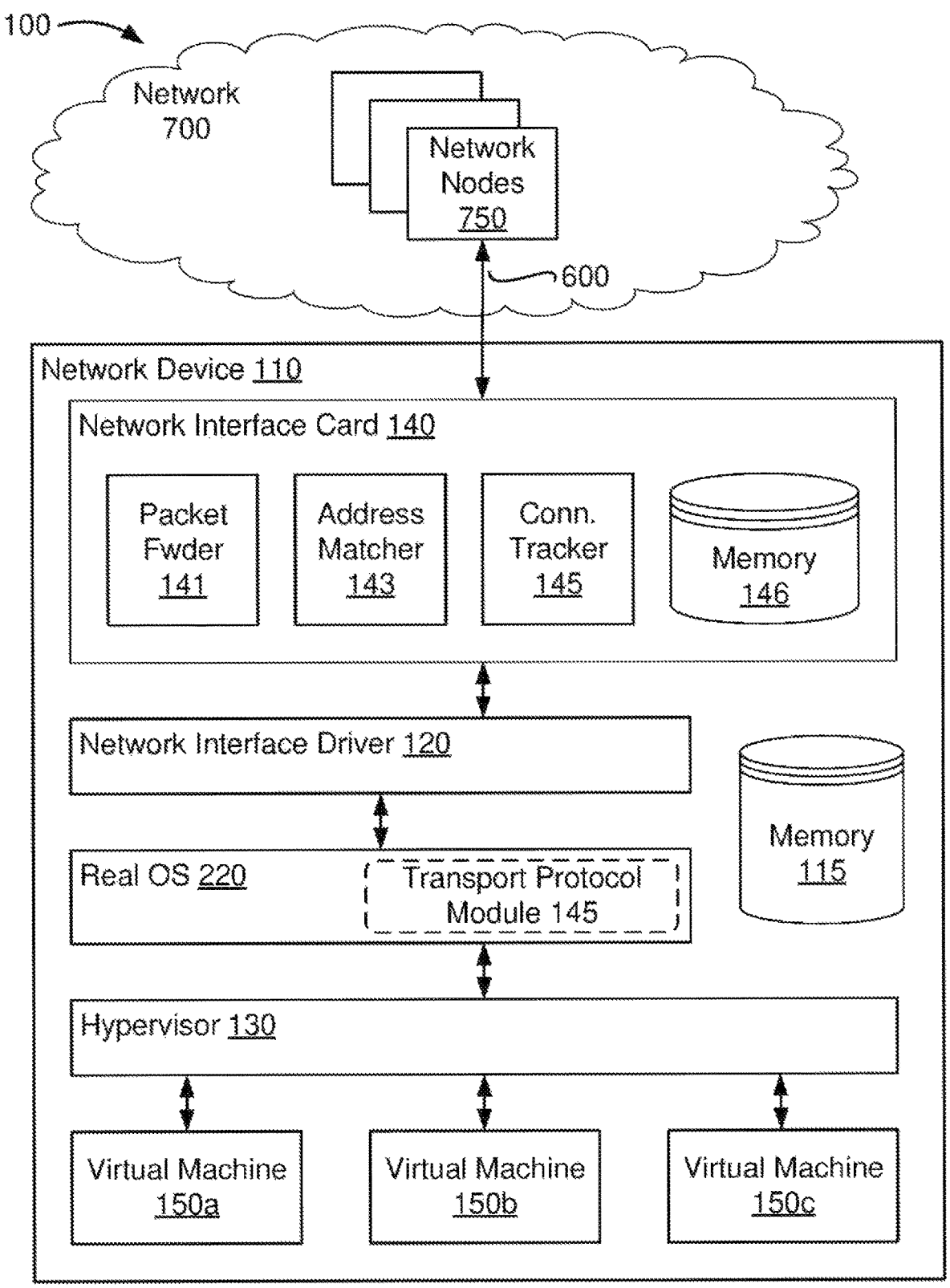
FIG. 1 is a block diagram of a network environment with a network device, according to some implementations.

This disclosure relates generally to systems and methods of offloading data packet processing from the CPU of a host or server to the host's network interface card. In a cloud computing environment, a single server or host may run multiple virtual machines. In some cases, the cloud service provider may create mechanisms to facilitate communication between virtual machines executing on a common host or on separate hosts. For reasons of security and stability of the system, the provider may not wish to grant virtual machines unfettered access to the provider's network. Accordingly, the provider can create a virtual network for a customer. The virtual network will allow a customer's virtual machines to communicate with each other, while restricting access to other customer's virtual machines and data.

Communicating within the virtual network can involve packet processing operations such as address lookup and translation, encapsulation, routing, inspection, and applying rules such as firewall or connection tracking rules. This disclosure describes offloading some of these functions to one or more processors on the network interface card, thereby freeing up cycles on the host CPU. The freed resources can be reclaimed by the virtual machines.

One particular class of offloads supports multicast functions. For example, the network interface card can provide multicast functionality via a virtual network overlaying a physical network that may or may not support multicasting. The network interface card can perform replication and encapsulation of a data packet, and deliver the encapsulated packets to virtual machines executing on one or more other remote devices. The data packet intended for multicast distribution may have a multicast header having a source virtual IP address (VIP) and a destination multicast group designation. In some implementations, the network interface card can encapsulate each replicated data packet with a unicast header that includes a next hop destination VIP and a second source VIP. The second source VIP can be used by the system for security and logging purposes. For example, use of the unicast encapsulation can facilitate certain unicast features such as security tokens.

The network interface card can receive data packets for multicasting from a source virtual machine executing on the host device, or from a source virtual machine executing on a remote device different from the host device. Similarly, the network interface card can forward encapsulated packets to virtual machines executing on its host device and to virtual machines executing on remote devices.

In some implementations, the system can include multiple host devices under the purview of a controller. The controller can create a "tree" for each multicast group. The tree can define distribution paths for the multicast group in a manner that divides the processing and bandwidth load among hosts so that no one host device must perform all replication, encapsulation, and transmission of data packets to all destinations. In such cases, the controller can provide each host device with a forwarding table that includes fewer than all possible destinations in the multicast group.

FIG. 1 is a block diagram of a network environment 100 with a network device 110, according to some implementations. In broad overview, the illustrated network environment 100 includes a network 700 of interconnected network nodes 750. The network nodes 750 participate in the network 700 as data sources, data destinations (or data sinks), and/or intermediary nodes such as switches, routers, and/or gateways propagating data from sources towards destinations through the network 700. The network 700 includes the network device 110 with links 600 to various other participating network nodes 750. Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network. The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network; for example, an ad hoc WiFi peer-to-peer network. Any type and/or form of data network and/or communication network can be used for the network 700. It can be public, private, or a combination of public and private networks. In general, the network 700 is used to convey information between computing devices; for example, network nodes 750, and the network device 110.

Figure 6:
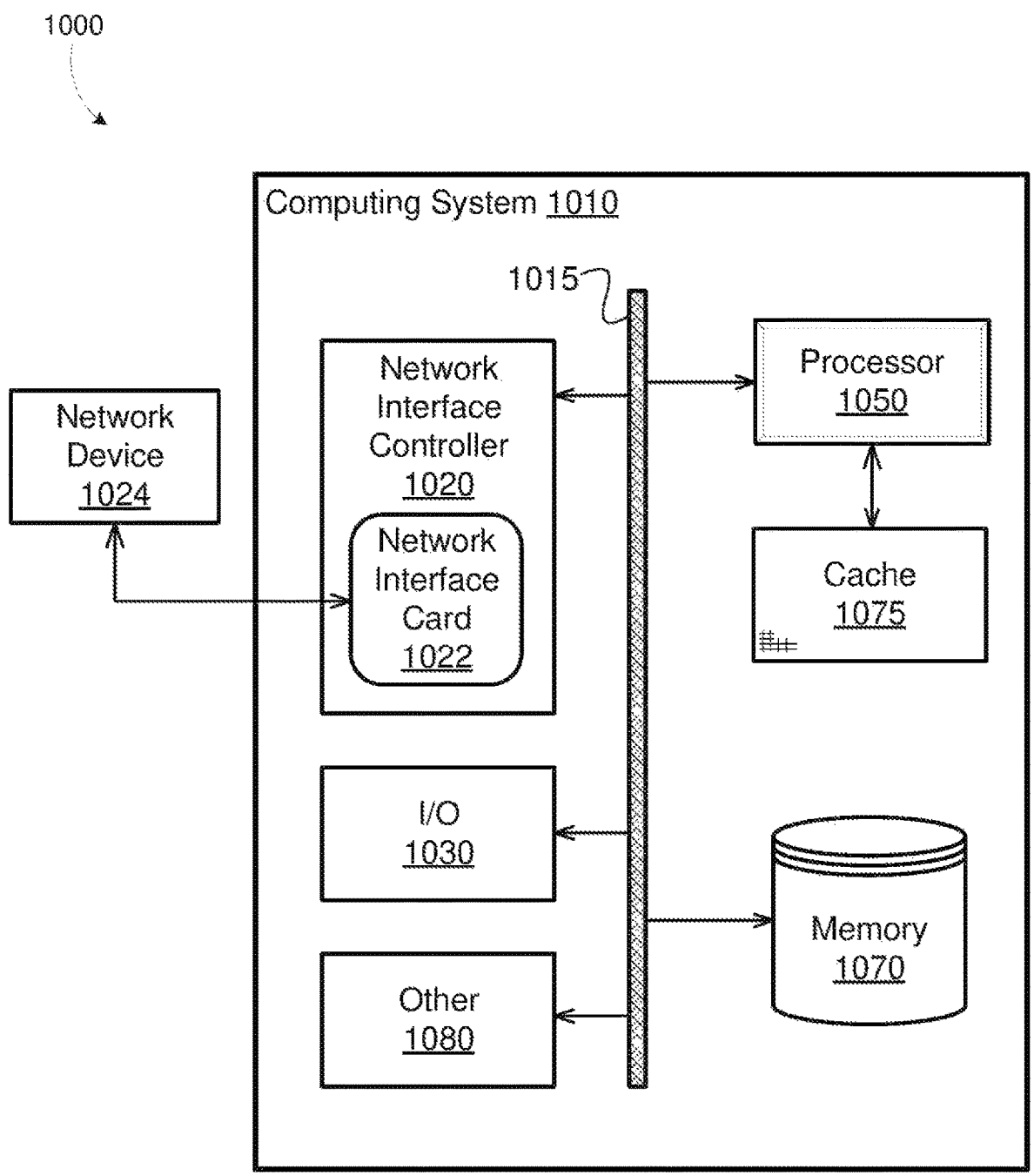
FIG. 6 is a block diagram of an example computing system that may be employed to implement elements of the systems and methods described and illustrated herein, according to an illustrative implementation.

As shown in FIG. 1, the network device 110 is a host device or server executing one or more virtual machines 150a-150c (generally virtual machines 150) on one or more CPUs of the network device 110. In some implementations, the network device 110 has a configuration similar to that of a computing system 1010 as shown in FIG. 6. For example, the memory 115 can have a configuration similar to that of a memory 1070 as shown in FIG. 6, and the network interface card 140 can have configuration similar to that of a network interface card 1022 and/or a network interface controller 1020 as shown in FIG. 6. The computing system 1010 is described in more detail below, in reference to FIG. 6. The elements shown in the computing system 1010 illustrated in FIG. 6 do not all need to be present in some implementations of the network device 110 illustrated in FIG. 1. The network device 110 includes a network interface driver 120, a memory 115, a network interface card 140, a real OS 220, a hypervisor 130, and the virtual machines 150. The hypervisor 130 manages operation of the virtual machines 150, including spinning up and terminating the virtual machines 150, managing allocation of memory 115 to the virtual machines 150, and live migrating the virtual machines 150 to other network devices.

The network device 110 can communicate with other network devices over the network 700. In some implementations, the network device 110 and other network devices can create or participate in one or more virtual networks to facilitate communication between virtual machines 150. The one or more virtual networks may overlay the physical network that makes up the network 700. Routing data packets within one of the virtual networks overlaying the physical network can be accomplished using a system of data packet encapsulation. The network device 110 and the network nodes 750 can route the data packets according to virtual IP addresses (VIPs). In some cases, the network device 110 can host one or more virtual machines that transmit data packets or receive data packets. In some cases, the network device 110 can be an intermediate node of a path between two virtual machines executing on two separate network devices 110. Accordingly, the network device 110 can act as a source, destination, or intermediate switch in one or more virtual networks.

The network device 110 includes the memory 115. In some implementations, the memory 115 may store computer executable instructions of a transport protocol module 145 (such as a TCP protocol module or the TCP layer of the network stack) to be executed on a processor of the network device 110. In some other implementations, the memory 115 may store computer executable instructions of a network interface driver 120. The memory 115 may store data and/or instructions related to the operation and use of the network interface driver 120. The memory 115 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The functionality described above as occurring within the TCP layer of a network device can be additionally or alternatively executed in another network protocol module within the transport layer, the network layer, or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module. As used herein, a network layer, a transport layer, or a combined transport/network layer will generally be referred to as a packet layer of the network protocol stack.

The network interface driver 120 can include a network interface driver software module running on a real OS. A network interface driver, such as the network interface driver 120, can be a collection of computer executable instructions stored in the memory 115 that when executed by a processor help facilitate network communications. In some other implementations, the network interface driver 120 may be implemented as logic implemented in a hardware processor or other integrated circuit, or as a combination of hardware and software logic. The network interface driver 120 can communicate with one of the software virtual machines 150 directly or via a guest OS of a virtual machine and/or a hypervisor. In some implementations, the network interface driver 120 is included within a first layer of a transmission control protocol (TCP) stack of the real OS 220 of the network device 110 and communicates with a software module or application that is included in an upper layer of the TCP stack. In one example, the network interface driver 120 is included within a transport layer of a TCP stack and communicates with a software module or application that is included in an application layer of the TCP stack. In another example, the network interface driver 120 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 120 can be included as a portion of the network interface card 140.

The network interface card 140 includes a packet forwarder 141, an address matcher 143, a connection tracker 145, and a memory 146. In some other implementations, the memory 146 may store computer executable instructions of a network interface card 140. The memory 146 may store data and/or instructions related to the operation and use of the network interface card 140. The memory 146 may store forwarding tables that include destination addresses corresponding to VIPs and multicast groups. The memory 146 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The network interface card 140 includes the packet forwarder 141. The packet forwarder 141 can be implemented in an application-specific integrated circuit (ASIC) or as software executing on a microprocessor. The packet forwarder 141 can receive packets for transmission from the virtual machines 150 and route them to one or more destination virtual machines executing on remote network devices. In particular, the packet forwarder 141 can replicate a data packet from a virtual machine 150 intended for multicast transmission, encapsulate each replicated packet with a unicast header, and transmit the encapsulated packets. By encapsulating the replicated packets with the unicast header, the packet forwarder 141 can provide multicast functionality to the virtual machines 150 even if the underlying physical network of the network 700 does not support multicast operations. For example, use of the unicast encapsulation can facilitate certain unicast features such as security tokens; however, a separate unicast encapsulation is not required for providing the multicast functionality to a strictly unicast physical network. Furthermore, offloading the replication and encapsulation operations to the network interface card 140 can preserve the processing resources of the CPU of the network device 110. The preserved processing resources can be made available to the virtual machines 150. Example operations of the egress process for transmitting multicast packets are described in further detail below with reference to FIGS. 2 and 3.

The packet forwarder 141 can also perform functions that allow the network interface card 140 to act as a destination and/or intermediate switch for multicast packets received over the links 600. For example, the packet forwarder 141 can receive a data packet over one of the lines 600, decapsulate the data packet, replicate the data packet as necessary, and forward the replicated data packets to one or more destination virtual machines 150 executing on the network device 110. If the network device 110 is also acting as an intermediate node of the virtual network, the packet forwarder 141 can take one of the replicated data packets and perform the egress multicast process to forward the multicast data packet to additional destination hosts and virtual machines. Example operations of the ingress process for receiving and forwarding multicast data packets are described in further detail below with reference to FIGS. 4 and 5.

The network interface card 140 includes the address matcher 143. The address matcher 143 can be implemented in an application-specific integrated circuit (ASIC) or as software executing on a microprocessor. The address matcher 143 can perform additional offload for virtual networking to free up network device 110 CPU cycles for use by the virtual machines. In particular, the address matcher 143 can perform longest prefix matching on a data packet transmitted from a local virtual machine to select a path to a remote destination virtual machine from a plurality of equal-cost multipath (ECMP) paths.

In an example operation, the address matcher 143 can receive a data packet from a local virtual machine—that is, a virtual machine 150 executing on the local network device 110—where the destination for the data packet is a virtual machine executing on a remote network device. The address matcher 143 can determine the destination virtual machine of the data packet based on a longest prefix match of a destination address of the data packet, where the destination address corresponds to the destination virtual machine. The address matcher 143 can select a path to the destination network device from a plurality of ECMP paths. The address matcher 143 can then encapsulate the data packet with an outer header having a second destination address that corresponds to the destination network device. The address matcher 143 can then transmit the encapsulated packet.

The network interface card 140 includes the connection tracker 145. The connection tracker 145 can be implemented in an application-specific integrated circuit (ASIC) or as software executing on a microprocessor. The connection tracker 145 can perform additional offload for virtual networking to free up network device 110 CPU resources for use by the virtual machines. For example, the connection tracker 145 can perform firewall type functions whereby it monitors packets for transmission from the virtual machines 150 executing on the network device 110 destined for target virtual machines, hosts, or clients external to the network device 110. The connection tracker 145 can determine whether either or both of a source port number or a destination port number fall within a range of port numbers permitted by the policies imposed on the network device 110 and/or the virtual machines 150. In addition, the connection tracker 145 can record metadata regarding the data packet in a connection flow table or other log maintained in the network interface card memory 146. In this manner, the connection tracker 145 can check port numbers and record log entries in hardware on the network interface card 140; that is, between the processor of the network interface card 140 and the memory 146 of the network interface card 140. Thus, firewalling and logging can be performed "in hardware" on the network interface card 140 without having to send the data packet to the network for processing "by software" executing on interface driver 120 or hypervisor 130, which is much slower and uses network device 110 CPU resources that could otherwise be used by the virtual machines 150.

In an example operation, the connection tracker can receive a data packet for transmission to a destination virtual machine remote from the network device 110. The connection tracker 145 can determine at least one of a source port number or a destination port number of the data packet fall within a permitted range of port numbers. If the connection tracker 145 determines that one of the port numbers is not within a permitted range, it can drop or block the data packet, and may also send a notification to the virtual machine 150 and/or the hypervisor 130 notifying it of a possible breach of a network policy. If the port number is determined to be within range, the connection tracker can insert an entry corresponding to the data packet in the connection flow table in the memory 146, and transmit the data packet.

Figure 2:
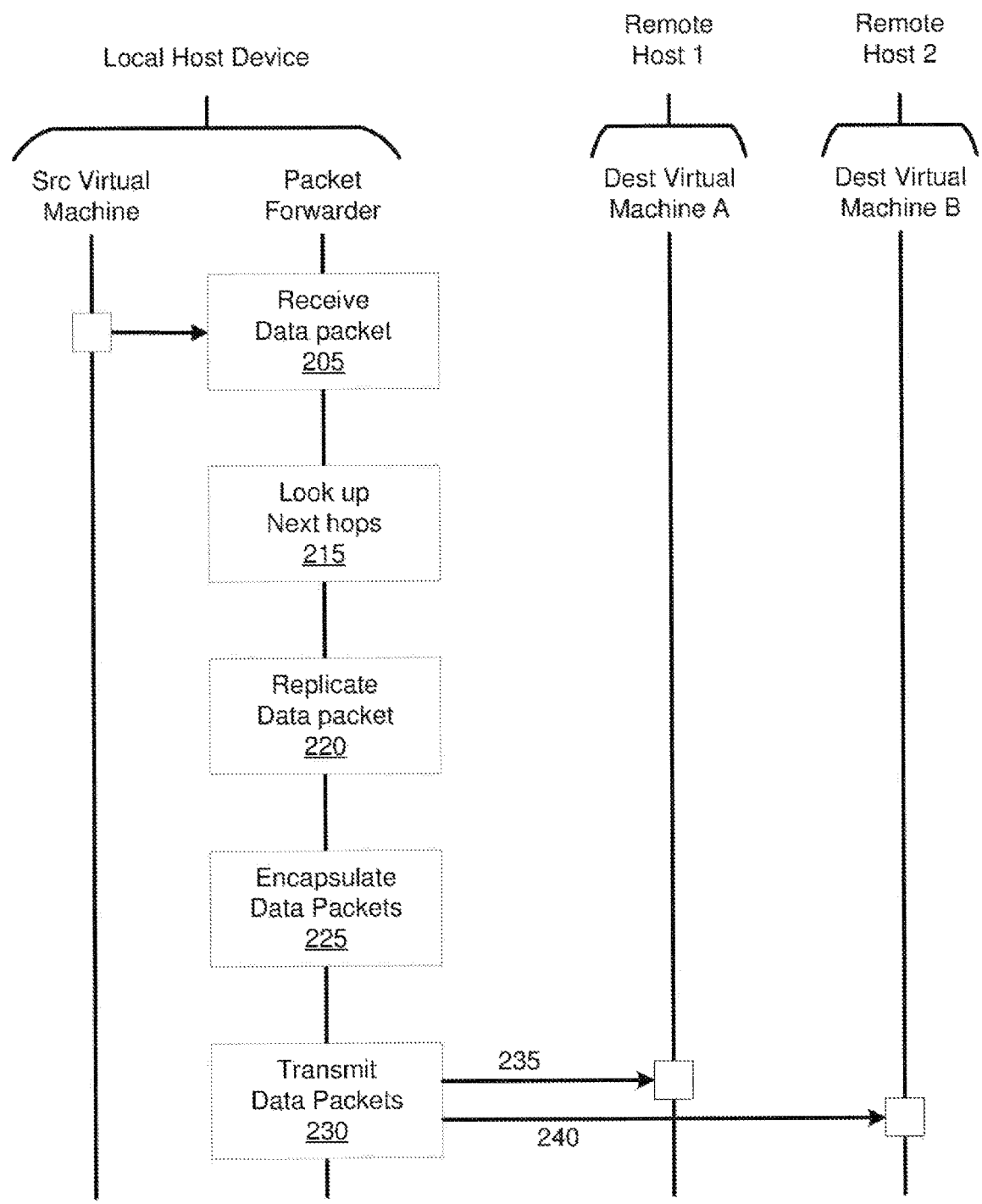
FIG. 2 is a diagram illustrating operations for transmitting multicast data packets in a virtual network, according to some implementations.

FIG. 2 is a diagram 200 illustrating operations for transmitting multicast packets in a virtual network, according to some implementations. The diagram 200 shows the interaction of various entities of a computer network during an example operation of transmitting multicast packets.

The packet forwarder of the network interface card can receive a data packet 205 for transmission. In some implementations, the packet forwarder may receive, from a virtual machine executing on the host device of the network interface card, a transmission request including metadata or address data providing information to the network interface card on how to generate the data packet for transmission. (In some implementations, the data packet can be received from a remote device different from the host device—such as in the example shown in the diagram 400 described in detail below.) If the data packet indicates a multicast transmission, for example, in the data packet header, the packet forwarder can perform the multicast egress process. The packet forwarder can look up the next hops 215 for the multicast data packet based on a destination multicast group designation in the header, and retrieve a list of next hop destinations. Each next hop destination can be one of a remote device different from the host device or a local virtual machine executing on the host device. The packet forwarder can replicate the data packet for each next hop destination indicated by the list of next hop destinations. In the example diagram 200 there are only two destinations: virtual machine A executing on remote host 1, and virtual machine B executing on remote host 2. In practical applications, however, the multicast group may include tens or hundreds of destinations. In some cases, the destinations can include one or more virtual machines executing on the same host device—such as in the example shown in the diagram 400 described in detail below.

The packet forwarder can replicate the data packet 220 to generate a copy for each next hop destination. The packet forwarder can then encapsulate each replicated packet 225 with a unicast header that includes a next hop destination virtual IP address (VIP) indicating the next hop destination and a second source VIP. The second source VIP may be different from the first source VIP, and can be used for facilitating certain functions of the virtual network communication, such as logging, encryption, and verifying that the source machine or device is a permissible sender of the packet. The packet forwarder can then transmit the encapsulated packets 230 to their respective destinations via the virtual network; in particular, the packet forwarder can send a first encapsulated packet 235 to virtual machine A and a second encapsulated packet 240 to virtual machine B.

Figure 3:
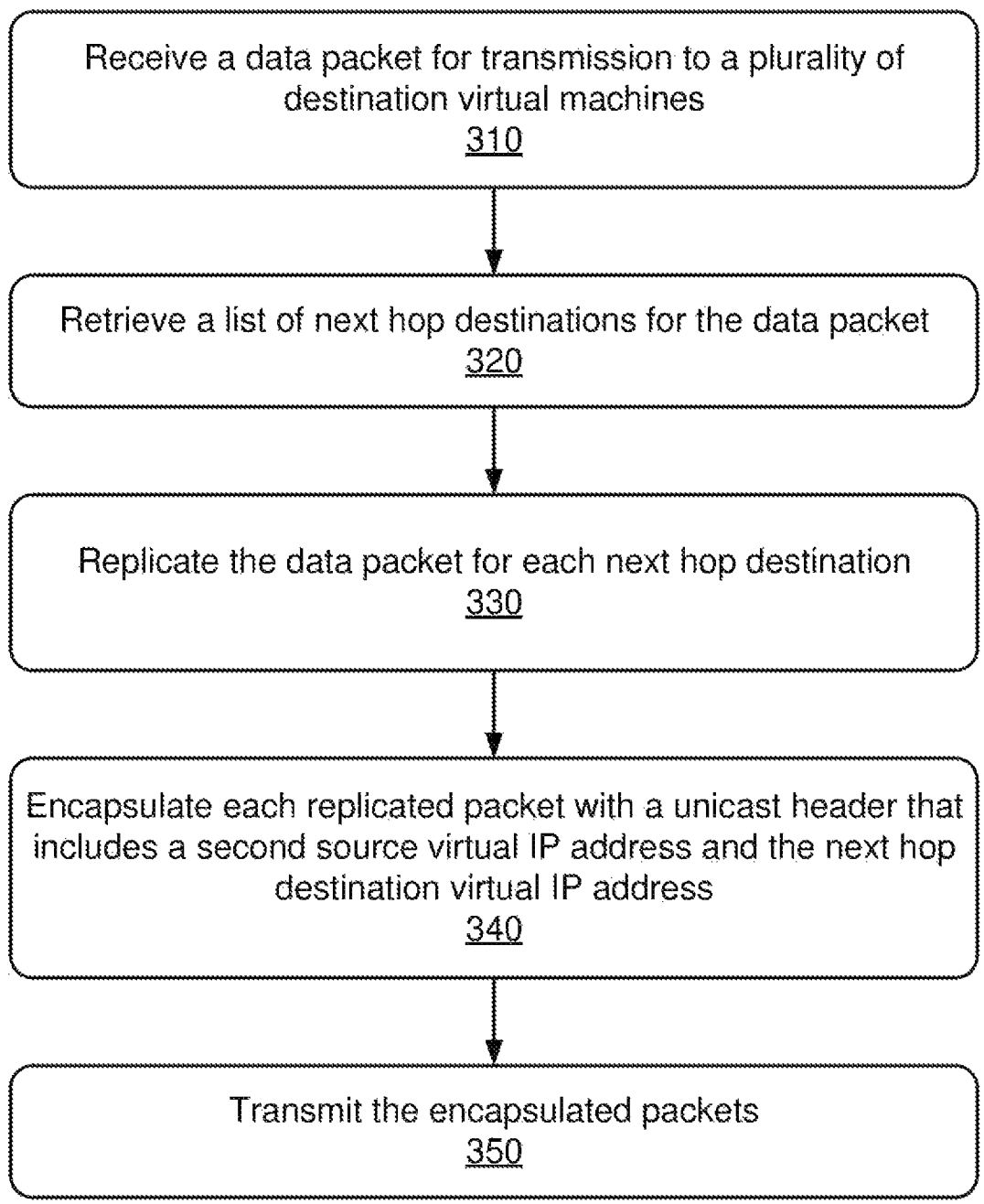
FIG. 3 is a flowchart showing operations of an example method of transmitting multicast data packets in a virtual network, according to some implementations.

FIG. 3 is a flowchart showing operations of an example method 300 of transmitting multicast packets in a virtual network, according to some implementations. The method 300 can be performed by a network interface card of a host device, such as the network interface card 140 previously described. The method 300 includes receiving a data packet for transmission to a plurality of destination virtual machines (stage 310). The method 300 includes retrieving a list of next hop destinations for the data packet (stage 320). The method 300 includes replicating the data packet for each next hop destination (stage 330). The method 300 includes encapsulating each replicated packet to generate an encapsulated packet with a unicast header that includes a next hop destination VIP indicating the next hop destination and a second source VIP (stage 340). The method 300 includes transmitting the encapsulated packets (stage 350).

The method 300 includes receiving a data packet for transmission to a plurality of destination virtual machines (stage 310). The network interface card of the host device can receive the data packet from a virtual machine executing on the host device. In some implementations, the data packet can be received in the form of a transmission request sent by the virtual machine, and the network interface card can use metadata and/or memory addresses contained in the transmission request to generate the data packet. The data packet or transmission request can include a source virtual IP address (VIP) and destination information, such as a destination multicast group designation corresponding to the multicast group having the intended recipients of the data packet.

The method 300 includes retrieving a list of next hop destinations for the data packet (stage 320). The network interface card can retrieve the list of next hop destinations for the data packet based on the destination multicast group designation contained in the header of the data packet. Each next hop destination can be a remote device different from the host device (or one or more virtual machines executing on a remote device), or a local virtual machine executing on the host device. In some implementations, the list of next hop destinations can be retrieved from a forwarding table residing in the network interface card memory. In some implementations, the method 300 can include receiving the forwarding table from a central controller. In some implementations, the forwarding table can represent a portion of a distribution tree for multicast packets. The complete distribution tree can map a distribution of multicast packets through all nodes of a virtual network. The portion of the distribution tree represented by entries of the forwarding table can therefore include fewer than all possible destinations corresponding to the destination multicast group designation. The network interface card therefore can rely on other nodes of the network to further replicate and disseminate the data packet, thereby sharing the processing and bandwidth load of the multicast process.

The method 300 includes replicating the data packet for each next hop destination (stage 330). The network interface card can replicate the packet according to the number of destinations listed in the list of next hop destinations. In some implementations, the network interface card will replicate the data packet for each destination host device, where each destination host device may be executing one or more virtual machines that are destinations of the data packet. In such implementations, the destination host device can replicate the received packet further, and forward the copies to the destination virtual machines executing on the destination host device. In some implementations, the network interface card can replicate the data packet for each destination virtual machine.

The method 300 includes encapsulating each replicated packet to generate an encapsulated packet with a unicast header that includes a next hop destination VIP indicating the next hop destination and a second source VIP (stage 340). The method 300 includes transmitting the encapsulated packets (stage 350). The nodes of the virtual network can route the encapsulated packets according to the next hop destination VIPs. In some implementations, the network interface card can transmit the encapsulated packets over a physical network that does not support multicasting. In other words, the virtual network is an overlay network over the physical network. And these operations, performed in one or more processors of the network interface card, can add multicast abilities to the virtual networks even though they are not supported in the underlying physical network. Furthermore, the operations of the multicasting egress process are performed in the network interface card hardware, and can thus be transparent to the virtual machines, hypervisor, real OS, and/or the network interface driver of the host device. In some implementations, the second source VIP can be used by the system for security and logging purposes.

Figure 4:
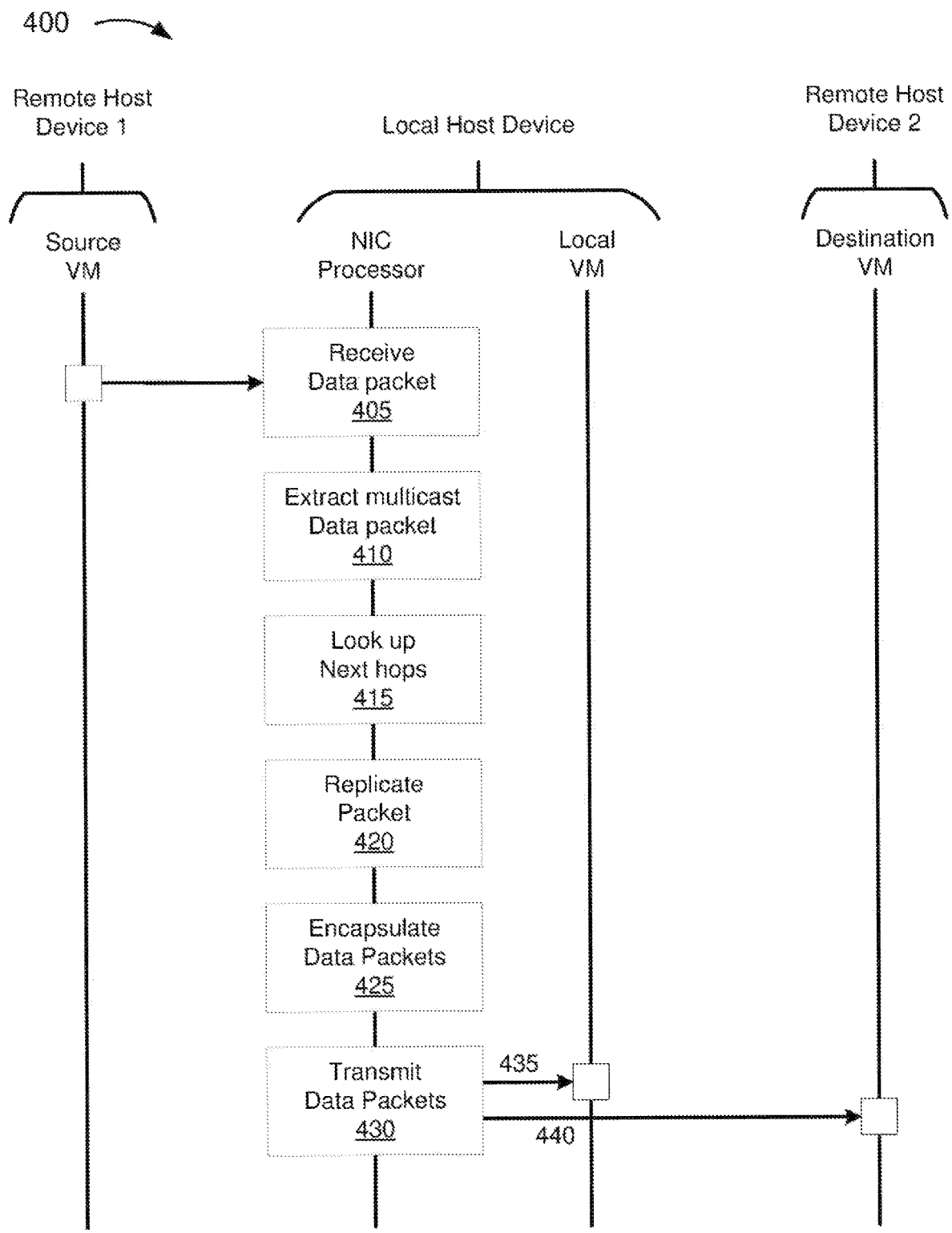
FIG. 4 is a diagram illustrating operations for receiving and forwarding multicast data packets in a virtual network, according to some implementations.

FIG. 4 is a diagram 400 illustrating operations for receiving and forwarding multicast packets in a virtual network, according to some implementations. The diagram 400 shows the interaction of various entities of a computer network during receipt and forwarding of multicast packets. In the example operations shown in the diagram 400, the local host device, which can be a network device such as the network device 110 previously described, can act as an intermediate node for multicast packets in a virtual network. The multicast packet originates at a source virtual machine executing on a remote host device 1. A network interface card of the local host device receives the multicast packet, replicates it, and routes replicated packets both to a local virtual machine—that is, a virtual machine executing on the local host device—as well as a destination virtual machine executing on a remote host device 2. In some implementations, however, the data packet can be received from a virtual machine executing on the host device of the network interface card—such as in the example shown in the diagram 200 and described in detail previously. In other words, the operations of receiving and transmitting packets as described with reference to diagrams 200 and 400 are not mutually exclusive, and can be combined or interchanged.

The network interface card of the local host device receives a data packet 405 transmitted from a source virtual machine executing on remote host device 1. If the data packet indicates a multicast transmission, for example, in the data packet header, the packet forwarder can perform the multicast egress process. The NIC processor can extract the multicast packet 410. The packet forwarder can look up the next hops 415 for the multicast data packet based on a destination multicast group designation in the header, and retrieve a list of next hop destinations. Each next hop destination can be one of a remote device different from the host device or a local virtual machine executing on the host device. The packet forwarder can replicate the data packet for each next hop destination indicated by the list of next hop destinations. In the example diagram 400 there are only two destinations: a local virtual machine executing on the local host device, and a destination virtual machine executing on a remote host device 2. In practical applications, however, the multicast group may include tens or hundreds of destinations.

The packet forwarder can replicate the data packet 420 to generate a copy for each next hop destination. The packet forwarder can then encapsulate each replicated packet 425 with a unicast header that includes a next hop destination virtual IP address (VIP) indicating the next hop destination and a second source VIP. The second source VIP may be different from the first source VIP, and can be used for facilitating certain functions of the virtual network communication, such as logging, encryption, and verifying that the source machine or device is a permissible sender of the packet. The packet forwarder can then transmit the encapsulated packets 230 to their respective destinations via the virtual network; in particular, the packet forwarder can send a first encapsulated packet 435 to the local virtual machine executing on the local host device, and a second encapsulated packet 240 to the destination virtual machine executing on the remote host device 2. The packet forwarder can transmit encapsulated packets destined for virtual machines on the local host device by inserting the packet (or an identifier corresponding to the packet) in an ingress queue assigned to the destination virtual machine. The virtual machine can then pull the encapsulated packet from the ingress queue and process it in the usual manner.

Figure 5:
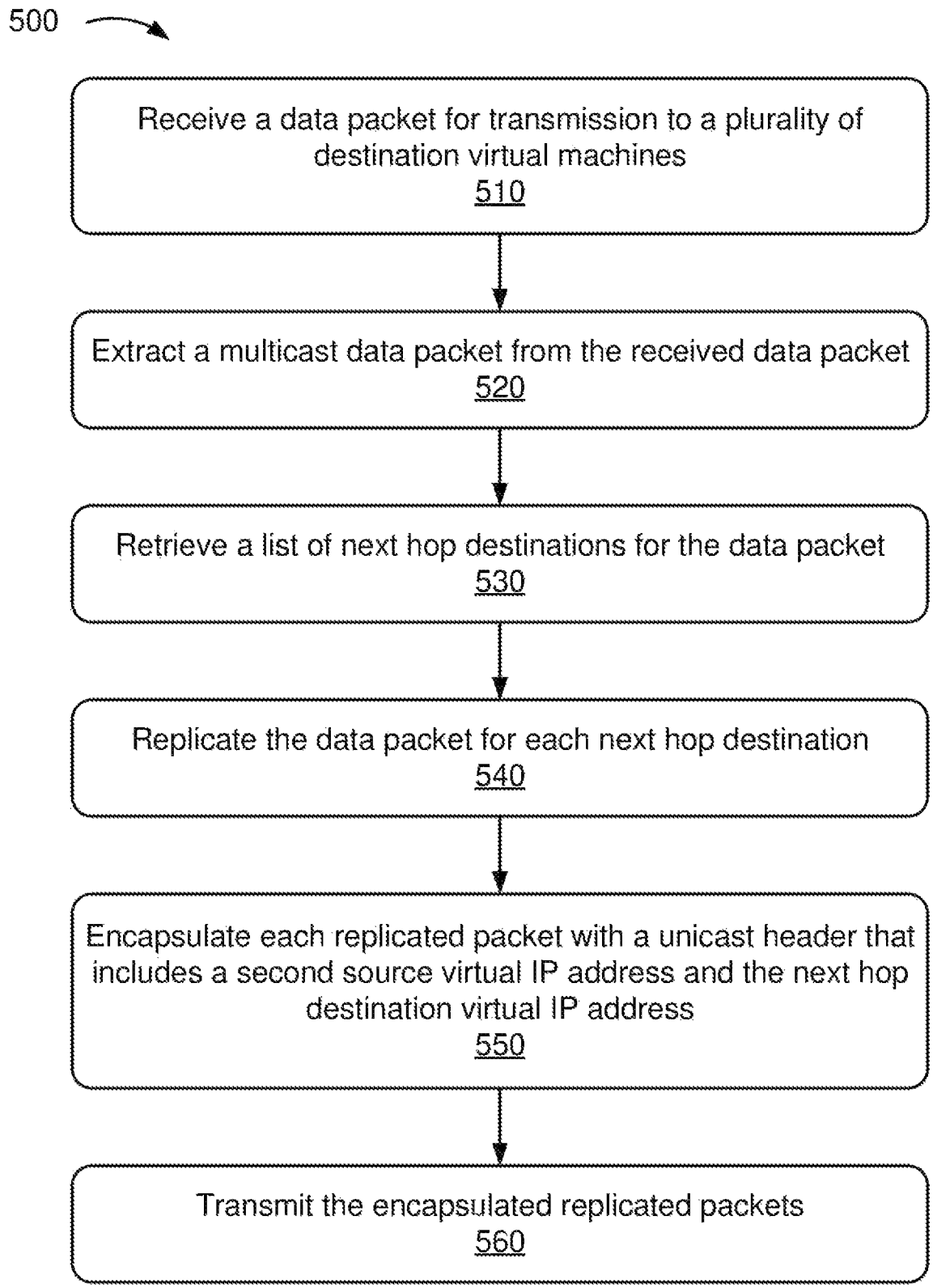
FIG. 5 is a flowchart showing operations of an example method of receiving and forwarding multicast data packets in a virtual network, according to some implementations.

FIG. 5 is a flowchart showing operations of an example method 500 of receiving and forwarding multicast packets in a virtual network, according to some implementations. The method 500 can be performed by a network interface card in a host device, such as the network interface card 140 in the network device 110 previously described. As in the diagram 400 shown in FIG. 4, the local host device can act as an intermediate node for multicast packets in the virtual network. The method 500 can be performed by a network interface card of a host device, such as the network interface card 140 previously described. The method 500 includes receiving a data packet for transmission to a plurality of destination virtual machines (stage 510). The method 500 includes extracting a multicast data packet from the received data packet (stage 520). The method 500 includes retrieving a list of next hop destinations for the data packet (stage 530). The method 500 includes replicating the data packet for each next hop destination (stage 540). The method 500 includes encapsulating each replicated packet to generate an encapsulated packet with a unicast header that includes a next hop destination VIP indicating the next hop destination and a second source VIP (stage 550). The method 500 includes transmitting the encapsulated packets (stage 560).

The method 500 includes receiving a data packet for transmission to a plurality of destination virtual machines (stage 510). The network interface card can receive the data packet from a remote virtual machine executing on a remote host device.

The method 500 includes extracting a multicast data packet from the received data packet (stage 520). The network interface card can decapsulate the packet and determining that the data packet is a multicast data packet.

The method 500 includes retrieving a list of next hop destinations for the data packet (stage 530). The network interface card can retrieve the list of next hop destinations for the data packet based on a destination multicast group designation contained in the header of the data packet. Each next hop destination can be a remote device different from the host device (or one or more virtual machines executing on a remote device), or a local virtual machine executing on the host device. In the example method 500, the packet has destinations both within the local host device and in a remote host device. In some implementations, the list of next hop destinations can be retrieved from a forwarding table residing in the network interface card memory. In some implementations, the method 500 can include receiving the forwarding table from a central controller. In some implementations, the forwarding table can represent a portion of a distribution tree for multicast packets. The complete distribution tree can map a distribution of multicast packets through all nodes of a virtual network. The portion of the distribution tree represented by entries of the forwarding table can therefore include fewer than all possible destinations corresponding to the destination multicast group designation. The network interface card therefore can rely on other nodes of the network to further replicate and disseminate the data packet, thereby sharing the processing and bandwidth load of the multicast process.

The remaining stages 540 through 560 follow the same egress multicast process described in the stages 330 to 350, respectively, to replicate, encapsulate, and transmit copies of the received multicast data packet to one or more destination virtual machines executing on one or more other local and/or remote host devices.

FIG. 6 is a block diagram illustrating a general architecture for a computer system 1000 that may be employed to implement elements of the systems and methods described and illustrated herein, according to an illustrative implementation.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080; for example, an I/O interface. The network interface card 1022 may have one or more network interface driver ports to communicate with the connected devices or components. Generally, a processor 1050 will execute instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1000 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown in FIG. 3 and FIG. 5 can be implemented within the network interface card in conjunction with the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1000 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 1010 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of routing data packets in a virtual network, the method comprising:
   receiving, at a processor of a network interface card of a host device, a multicast data packet for transmission to a plurality of destination virtual machines;
   retrieving, by the processor, a list of next hop destinations for the multicast data packet based on a destination multicast group designation;
   replicating, by the processor, the multicast data packet for each next hop destination;
   encapsulating, by the processor, each replicated packet with a header that includes a next hop destination virtual IP address (VIP) indicating the next hop destination; and
   transmitting, by the processor, the encapsulated packets.

2. The method of claim 1, wherein the processor receives the multicast data packet from a virtual machine executing on a remote host device.

3. The method of claim 1, wherein the multicast data packet has a multicast header that includes a first source VIP and the destination multicast group designation.

4. The method of claim 1, wherein transmitting the encapsulated packets includes transmitting a first encapsulated packet of the encapsulated packets to a local virtual machine executing on the host device by inserting the first encapsulated packet in an ingress queue for the local virtual machine indicated by a first next hop destination VIP.

5. The method of claim 1, wherein transmitting the encapsulated packets includes transmitting a first encapsulated packet of the encapsulated packets to a remote device indicated by a first next hop destination VIP.

6. The method of claim 1, further comprising receiving, at the processor from a central controller, a forwarding table including the list of next hop destinations corresponding to the destination multicast group designation.

7. The method of claim 6, wherein the list of next hop destinations in the forwarding table includes fewer than all possible destinations corresponding to the destination multicast group designation.

8. A network interface card configured to route data packets in a virtual network, the network interface card residing in a host device and comprising a processor configured to:
   receive a multicast data packet for transmission to a plurality of destination virtual machines;
   retrieve a list of next hop destinations for the multicast data packet based on a destination multicast group designation;
   replicate the data packet for each next hop destination;
   encapsulate each replicated packet with a unicast header that includes a next hop destination virtual IP address (VIP) indicating the next hop destination; and
   transmit the encapsulated packets.

9. The network interface card of claim 8, wherein the processor is configured to receive the multicast data packet from a virtual machine executing on a remote host device.

10. The network interface card of claim 8, wherein the multicast data packet has a multicast header that includes a first source VIP and the destination multicast group designation.

11. The network interface card of claim 8, wherein the processor is configured to transmit a first encapsulated packet of the encapsulated packets to a local virtual machine executing on the host device by inserting the first encapsulated packet in an ingress queue for the local virtual machine indicated by a first next hop destination VIP.

12. The network interface card of claim 8, wherein the processor is configured to transmit a first encapsulated packet of the encapsulated packets to a remote device indicated by a first next hop destination VIP.

13. The network interface card of claim 8, wherein the processor is configured to decapsulate the multicast packet and determine a packet type.

14. The network interface card of claim 8, wherein the processor is configured to receive, from a central controller, a forwarding table including the list of next hop destinations corresponding to the destination multicast group designation.

15. The network interface card of claim 14, wherein the list of next hop destinations in the forwarding table includes fewer than all possible destinations corresponding to the destination multicast group designation.

16. A non-transitory computer-readable medium storing instructions, that when executed by one or more processors of a network interface card of a host device, cause the one or more processors to:
   receive a multicast data packet for transmission to a plurality of destination virtual machines;
   retrieve a list of next hop destinations for the multicast data packet based on a destination multicast group designation;
   replicate the multicast data packet for each next hop destination;
   encapsulate each replicated packet with a unicast header that includes a next hop destination virtual IP address (VIP) indicating the next hop destination; and
   transmit the encapsulated packets.

17. The non-transitory computer-readable medium of claim 16, wherein the multicast data packet is received from a virtual machine executing on a remote host device.

18. The non-transitory computer-readable medium of claim 16, wherein the multicast data packet has a multicast header that includes a first source VIP and the destination multicast group designation.

19. The non-transitory computer-readable medium of claim 16, wherein the instructions further cause the one or more processors to transmit a first encapsulated packet of the encapsulated packets to a local virtual machine executing on the host device by inserting the first encapsulated packet in an ingress queue for the local virtual machine indicated by a first next hop destination VIP.

20. The non-transitory computer-readable medium of claim 16, wherein the instructions further cause the one or more processors to transmit a first encapsulated packet of the encapsulated packets to a remote device indicated by a first next hop destination VIP.

\* \* \* \* \*